United States Patent
Ikhlef (10) Patent No.: US 6,979,826 B2
(45) Date of Patent: Dec. 27, 2005

(54) SCINTILLATOR GEOMETRY FOR ENHANCED RADIATION DETECTION AND REDUCED ERROR SENSITIVITY

(75) Inventor: Abdelaziz Ikhlef, Waukesha, WI (US)

(73) Assignee: GE Medical Systems Global Technology Company LLC, Waukesha, WI (US)

(*) Notice: Subject to any disclaimer, the term of this patent is extended or adjusted under 35 U.S.C. 154(b) by 192 days.

(21) Appl. No.: 10/064,590

(22) Filed: Jul. 29, 2002

(65) Prior Publication Data

US 2004/0016885 A1 Jan. 29, 2004

(51) Int. Cl.⁷ ............................................. G01T 1/202
(52) U.S. Cl. .................. 250/367; 250/361 R; 250/368; 250/370.11; 250/483.1
(58) Field of Search ................. 250/367, 361 R, 250/368, 370.11, 483.1

(56) References Cited

U.S. PATENT DOCUMENTS

| | | | |
|---|---|---|---|
| 4,159,424 A | 6/1979 | Kingsley | 250/483 |
| 4,180,737 A | 12/1979 | Kingsley | 250/367 |
| 4,234,792 A * | 11/1980 | DeCou et al. | 250/370.09 |
| 4,323,925 A * | 4/1982 | Abell et al. | 348/340 |
| 5,059,800 A | 10/1991 | Cueman et al. | 250/367 |
| 5,241,180 A * | 8/1993 | Ishaque et al. | 250/361 R |
| 6,295,331 B1 | 9/2001 | Hsieh | 378/19 |
| 6,344,649 B2 | 2/2002 | Riedner et al. | 250/367 |
| 6,414,315 B1 | 7/2002 | Wei et al. | 250/370.11 |
| 2002/0067796 A1 * | 6/2002 | Hoffman | 378/19 |

FOREIGN PATENT DOCUMENTS

EP  0785444 A  7/1997

OTHER PUBLICATIONS

EPO Form 1507.0 (03.95) (3 pages) Nov. 28, 2003.

* cited by examiner

Primary Examiner—David Porta
Assistant Examiner—Christine Sung
(74) Attorney, Agent, or Firm—Cantor Colburn LLP (57) ABSTRACT

Disclosed is a radiation detector element assembly. The radiation detector assembly comprises a scintillator and a photo sensor, the scintillator including a first surface proximate to a photo sensor and a second surface distal to the first surface and receptive to a radiation beam. The radiation detector also includes a side portion of the scintillator configured to intercept impingement of a radiation beam thereon and reduce response of the photo sensor to said impingement on the side portion. Also disclosed herein is a method of detecting an incident radiation beam. The method comprising: receiving a radiation beam incident upon a second surface of a scintillator, the scintillator including a first surface proximate to a photo sensor and a second surface distal to the first surface. The method further includes intercepting impingement of a radiation beam with a side portion of the scintillator, the side portion of the scintillator configured to reduce non-linear differential response (in the channel to channel difference) of the photo sensor to the impingement on the side portion. This also enables the reduction of the sensitivity of the scintillation photo sensor to the focal spot motion.

23 Claims, 6 Drawing Sheets

SCINTILLATOR RESPONSE IN TILTED GEOMETRY

| Tilt (deg) | Gain (cts) | % Gain increase |
|---|---|---|
| 0 | 116929 | 0.00% |
| 0.5 | 118130 | 1.02% |
| 1.5 | 121859 | 4.05% |

FIG. 6

SCINTILLATOR GEOMETRY FOR ENHANCED RADIATION DETECTION AND REDUCED ERROR SENSITIVITY

BACKGROUND OF INVENTION

This invention relates generally to imaging systems and specifically to scintillator pixel geometries.

In CT imaging systems, an x-ray source projects a fan-shaped beam that is collimated to lie within an X-Y plane, generally referred to as an "imaging plane", of a Cartesian coordinate system toward an array of radiation detectors, wherein each radiation detector includes a detector element disposed within the CT system so as to receive this fan-shaped beam. An object, such as a patient, is disposed between the x-ray source and the radiation detector to lie within the imaging plane and thus is subjected to the x-ray beam, which passes through the object. As the x-ray beam passes through the object, the x-ray beam becomes attenuated before impinging upon the array of radiation detectors. The intensity of the attenuated beam radiation received at the detector array is responsive to the attenuation of the x-ray beam by the object, wherein each detector element produces a separate electrical signal responsive to the beam intensity at the detector element location. These electrical signals are referred to as x-ray attenuation measurements or x-ray images.

The x-ray source and the detector array may be rotated, with a gantry within the imaging plane, around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and the detector array. In an axial scan, the projection data is processed so as to construct an image that corresponds to a two-dimensional slice taken through the object. In CT systems that employ a single detector array, the slice thickness is controlled and determined by the width of the collimator, while in CT systems that employ a multiple detector array, the slice thickness is controlled and determined by summing the contributions of a plurality of detector sub-units and by physically moving the collimator to the outer edges of each slice.

Generally, the edges of a scintillation pixel are x-ray shielded so that they become insensitive to an x-ray beam regardless of the beam's angle or focal spot motion in the x or z-direction. One method of x-ray shielding pixel edges includes, positioning alternating tungsten wires in the x-direction and over pixel edges to prevent x-ray beams from reaching normally non-scintillating areas, e.g., gaps between pixels, such as the pixel edges, and the like. However, such methods may result in a reduction of spatial image resolution and light output resultant from the blockage of otherwise scintillating areas. Therefore, there is a need in the art controlling scintillator pixel geometries to reduce excessive x-ray beam-pixel contact, while avoiding an excessive reduction in spatial resolution by removing the shielding wires.

SUMMARY OF INVENTION

The above discussed and other drawbacks and deficiencies are overcome or alleviated by a radiation detector element assembly. The radiation detector assembly comprises a scintillator and a photo sensor, the scintillator including a first surface proximate to a photo sensor and a second surface distal to the first surface and receptive to a radiation beam. The radiation detector also includes a side portion of the scintillator configured to intercept impingement of a radiation beam thereon and reduce response of the photo sensor to said impingement on side portion.

Also disclosed herein is a method of detecting an incident radiation beam. The method comprising: receiving a radiation beam incident upon a second surface of a scintillator, the scintillator including a first surface proximate to a photo sensor and a second surface distal to the first surface. The method further includes intercepting impingement of a radiation beam with a side portion of the scintillator, the side portion of the scintillator configured to reduce response of the photo sensor to the impingement on the side portion. An additional feature of the invention disclosed herein is that it will also minimize the non-linear variation between adjacent cells due to imperfection in the edges (side surfaces).

Further disclosed herein is a radiation detector array for use in imaging systems. The radiation detector array comprising: a scintillator array disposed in an operable configuration with a photo sensor array, the scintillator array including a plurality of scintillators and the photo sensor array including a plurality of photo sensors. The radiation detector array further comprising each scintillator of the plurality of scintillators including a first surface proximate to a photo sensor of the plurality of photo sensors and a second surface distal to the first surface and receptive to a radiation beam and a side portion of each scintillator configured to intercept impingement of a radiation beam thereon and reduce response of each respective photo sensor to impingement on side portion.

Also disclosed herein is a means for detecting an incident radiation beam. The means for detecting an incident radiation beam comprising: a means for receiving a radiation beam incident upon a second surface of a scintillator, the scintillator including a first surface proximate to a photo sensor and a second surface distal to the first surface and a means for intercepting impingement of a radiation beam with a side portion of the scintillator, the side portion of the scintillator configured to reduce response of the photo sensor to impingement on the side portion.

BRIEF DESCRIPTION OF DRAWINGS

Referring to the exemplary drawings wherein elements are numbered alike in the several Figures.

DETAILED DESCRIPTION

While an exemplary system and method for acquiring x-ray data is disclosed herein with reference to a computed tomography (CT) imaging system, it should be understood that the method and system of the present invention may be applied to other imaging systems, including those requiring scintillation, as well as flat panel detector systems.

Figure 1:
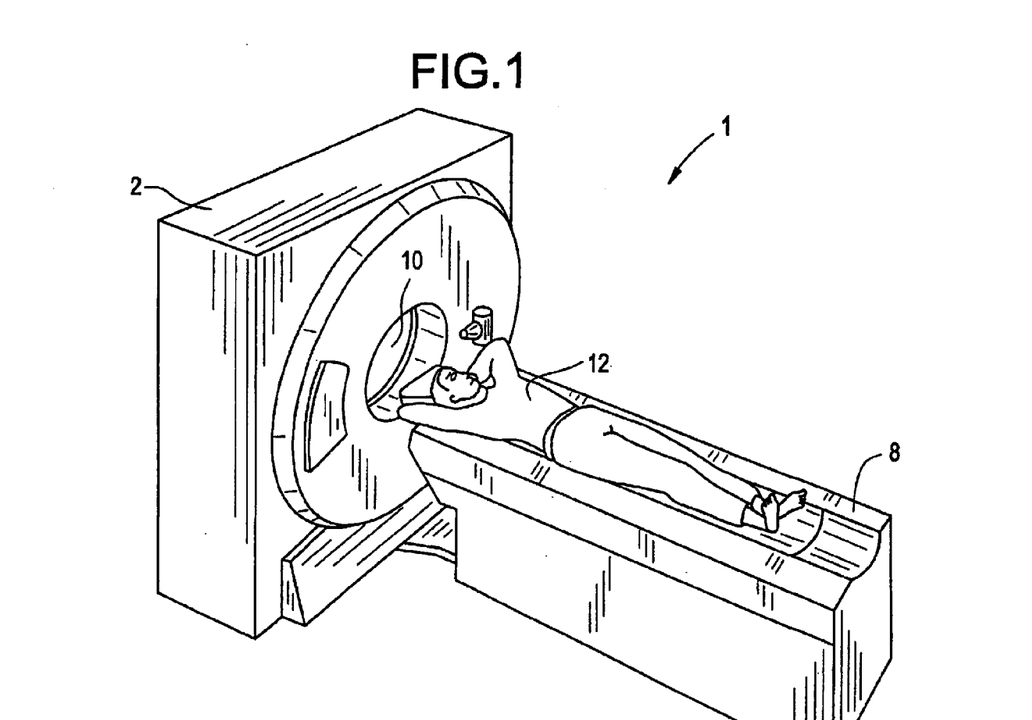
FIG. 1 depicts an exemplary CT imaging system including a patient disposed for imaging.
Figure 2:
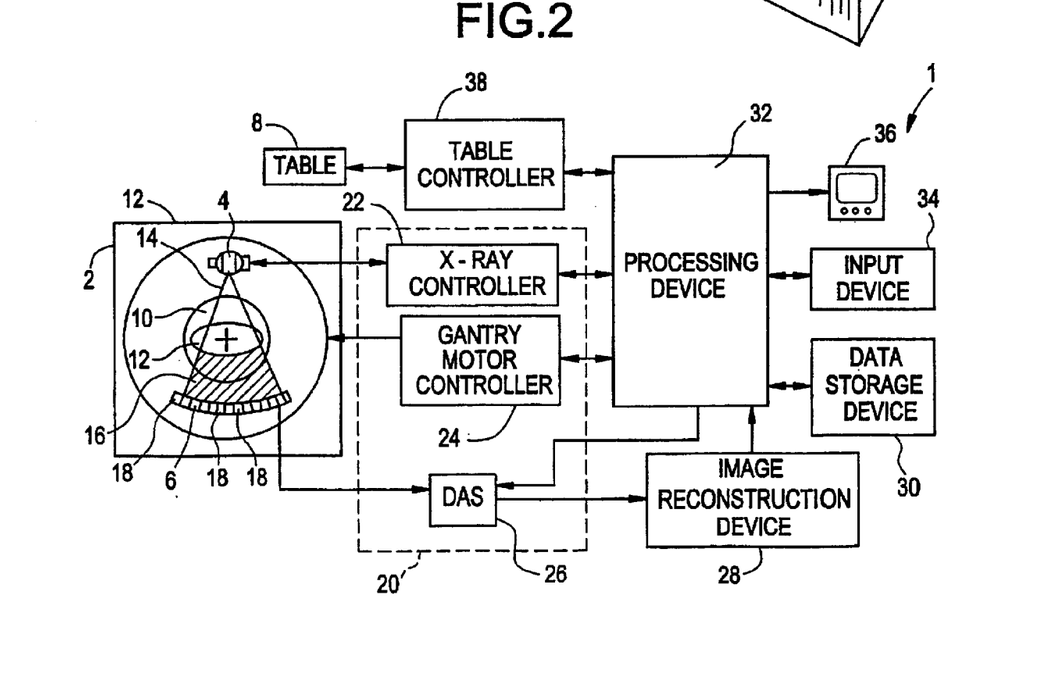
FIG. 2 is a block schematic diagram of an exemplary CT imaging system.

Referring to FIG. 1 and FIG. 2, an exemplary CT imaging system 1 is shown that includes a gantry 2 having an x-ray source 4, a radiation detector 6, a patient support structure 8 and a object cavity 10, wherein x-ray source 4 and radiation detector 6 are opposingly disposed so as to be separated by object cavity 10. An object, such as a patient 12, is disposed upon a displaceable patient support structure 8 ("table"), which is then displaced along an axis 3 extending through object cavity 10. X-ray source 4 projects an x-ray beam 14 toward radiation detector 6 intended to pass through patient 12. X-ray beam 14 is collimated by a collimator so as to lie within an X-Y plane of a Cartesian coordinate system referred to as an "imaging plane". After passing through and becoming attenuated by patient 12, attenuated x-ray beam 16 is received by radiation detector 6. Radiation detector 6 includes a plurality of detector elements 18 wherein each of said detector elements 18 receives attenuated x-ray beam 16 and produces an electrical signal responsive to the intensity of attenuated x-ray beam 16. A group of x-ray attenuation measurements, e.g., projection data, from the radiation detector at one gantry 2 angle is referred to and herein denoted as a "view". A "scan" of the object comprises a set of views made at different gantry angles, or view angles, during one revolution of the x-ray source 4 and radiation detector 6. In an axial scan, the projection data is processed to construct an image that corresponds to a two dimensional "slice" taken through the object, where a slice corresponds to a slice thickness in the z-direction.

In addition, x-ray source 4 and radiation detector 6 are rotatingly disposed relative to gantry 2 and patient support structure 8, so as to allow x-ray source 4 and radiation detector 6 to rotate around patient support structure 8 when patient support structure 8 is disposed within object cavity 10. X-ray projection data is obtained by rotating x-ray source 4 and radiation detector 6 around patient 12 during a scan. Helical x-ray projection data is obtained by additionally displacing patient 12 along an axis 3. X-ray source 4 and radiation detector 6 communicate with a control mechanism 20 associated with CT imaging system 1. Control mechanism 20 controls the rotation and operation of x-ray source 4 and radiation detector 6.

Control mechanism 20 includes an x-ray controller 22 communicating with x-ray source 4, a gantry motor controller 24, and a data acquisition system ("DAS") 26. DAS 26 communicates with radiation detector 6. X-ray controller 22 provides power and timing signals to x-ray source 4, gantry motor controller 24 controls the rotational speed and angular position of x-ray source 4 and DAS 26 receives the electrical signals produced by detector elements 18 and converts the signals into data signals for subsequent processing. CT imaging system 1 includes an image reconstruction device 28, a data storage device 30 and a processing device 32, wherein processing device 32 communicates with image reconstruction device 28, gantry motor controller 24, x-ray controller 22, data storage device 30, input device 34 and output device 36. Data storage device 30 comprises any computer usable storage medium known to one of ordinary skill in the art and is in communication with processing device 32 via a propagated computer data signal 5. CT imaging system 1 also includes a table controller 38 communicated with processing device 32 and patient support structure 8, so as to control the position of patient support structure 8 relative to object cavity 10.

Patient 12 is preferably disposed on patient support structure 8, which is then positioned by an operator via processing device 32 so as to be displaceable within object cavity 10. Gantry motor controller 24 is operated via processing device 32 to cause x-ray source 4 and radiation detector 6 to rotate relative to patient 12. X-ray controller 22 is operated via processing device 32 so as to cause x-ray source 4 to emit and project a collimated x-ray beam 14 toward radiation detector 6 and hence toward patient 12. X-ray beam 14 passes through patient 12 to create an attenuated x-ray beam 16, which is received by radiation detector 6.

Detector elements 18 also denoted as cells, receive attenuated x-ray beam 16, produce electrical signals responsive to the intensity of attenuated x-ray beam 16 and propagates this electrical signal data to DAS 26. DAS 26 then converts the electrical signals to data signals and communicates the data signals to image reconstruction device 28. Image reconstruction devices perform high-speed image reconstruction. Reconstructed images, are stored in data storage device 30 and are displayed via output device 36.

Referring now to FIGS. 3-6 a depiction of an radiation detector 6 is provided. In an exemplary embodiment, the radiation detector 6 is configured as a multidimensional detector array of detector elements 18. The array of the radiation detector 6 may be configured as an arc length segment of length g (gamma) and a linear (in this instance) depth n along axis 3. The length is hereinafter known as channels γ for the radiation detector 6, while β identifies views, and n identifies rows as described earlier herein.

Figure 3:
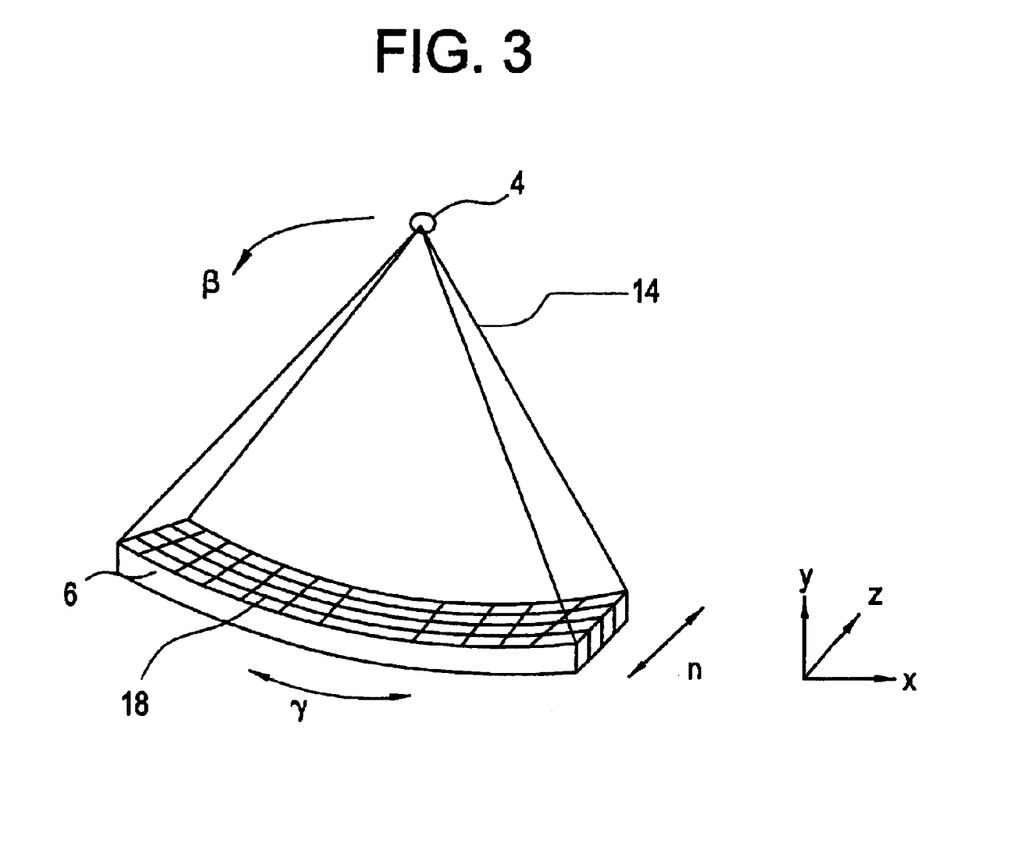
FIG. 3 is a diagram depicting an illustrative radiation detector.

Each detector element 18 includes a scintillator 46 and a photo sensor 44. The photo sensor 44 may be deposited, or formed, on a substrate 48, and scintillator array 46 is positioned over and secured to substrate 48. The photo sensor(s) 44 is optically coupled to scintillator(s) 46 and include electrical output lines for transmitting signals representative of the light output by scintillator 46. Particularly, each photo sensor 44 produces a separate low level electrical analog output signal that is a measurement of the beam attenuation for a specific scintillator 46.

An exemplary configuration for radiation detector 6 includes about twenty four (24) rows n and about 912 columns "detector channels" denoted by g (gamma) of detectors elements 18. Such an array configuration for radiation detector 6 facilitates imaging up to about sixteen simultaneous slices of data to be collected with each rotation of gantry 2 (shown in FIG. 1). Moreover, radiation detector 6 may be operated in many different slice thickness and number modes. Depending upon the specific various combinations of photo sensor 44 outputs that can be enabled, disabled, or combined, the slice thickness may, for example, be about 0.625 mm, 1.25 mm, 2.5 mm, 3.75 mm, or 5 mm. Additional examples include, a single slice mode including one slice with slices ranging from about 0.625 mm thick to about 20 mm thick, and a two slice mode including two slices with slices ranging from 0.625 mm thick to 10 mm thick. Of course, many other modes are possible.

It will be appreciated that while the radiation detector 6 is described in terms of an array of detector element 18 including a scintillator 46 and a photo sensor 44, other configurations are achievable and utilized. For example, the radiation detector 6 may be configured as a combination of multidimensional arrays, in one instance, a multidimensional scintillator array and a high-density semiconductor (photo sensor) array. The scintillator array may include a plurality of scintillation elements arranged in an array, and the semiconductor array includes a plurality of photo sensors e.g., photodiodes arranged in an identical array. The photo sensors are deposited, or formed, on a substrate, and scintillator array is positioned over and secured to substrate.

Imaging arrays may include, but not be limited to a photo sensor array coupled to a scintillating medium. Radiation absorbed in the scintillator generates optical photons, which in turn pass into a photo sensor, including, but not limited to, a phototransistor or a photodiode. The photon is absorbed in the photo sensor and an electrical signal corresponding to an incident photon flux is generated. Photo sensors or any photosensitive elements, such as photodiodes, can be formed in connection with necessary control or switching elements, such as thin film transistors (TFTs), in a relatively large array. Radiation detectors 6 are typically fabricated on a large substrate on which many components, including TFTs, address lines, capacitors, and devices such as photo sensors, are formed through the deposition and patterning of layers of conductive, semiconductive, and insulative materials.

Figure 4:
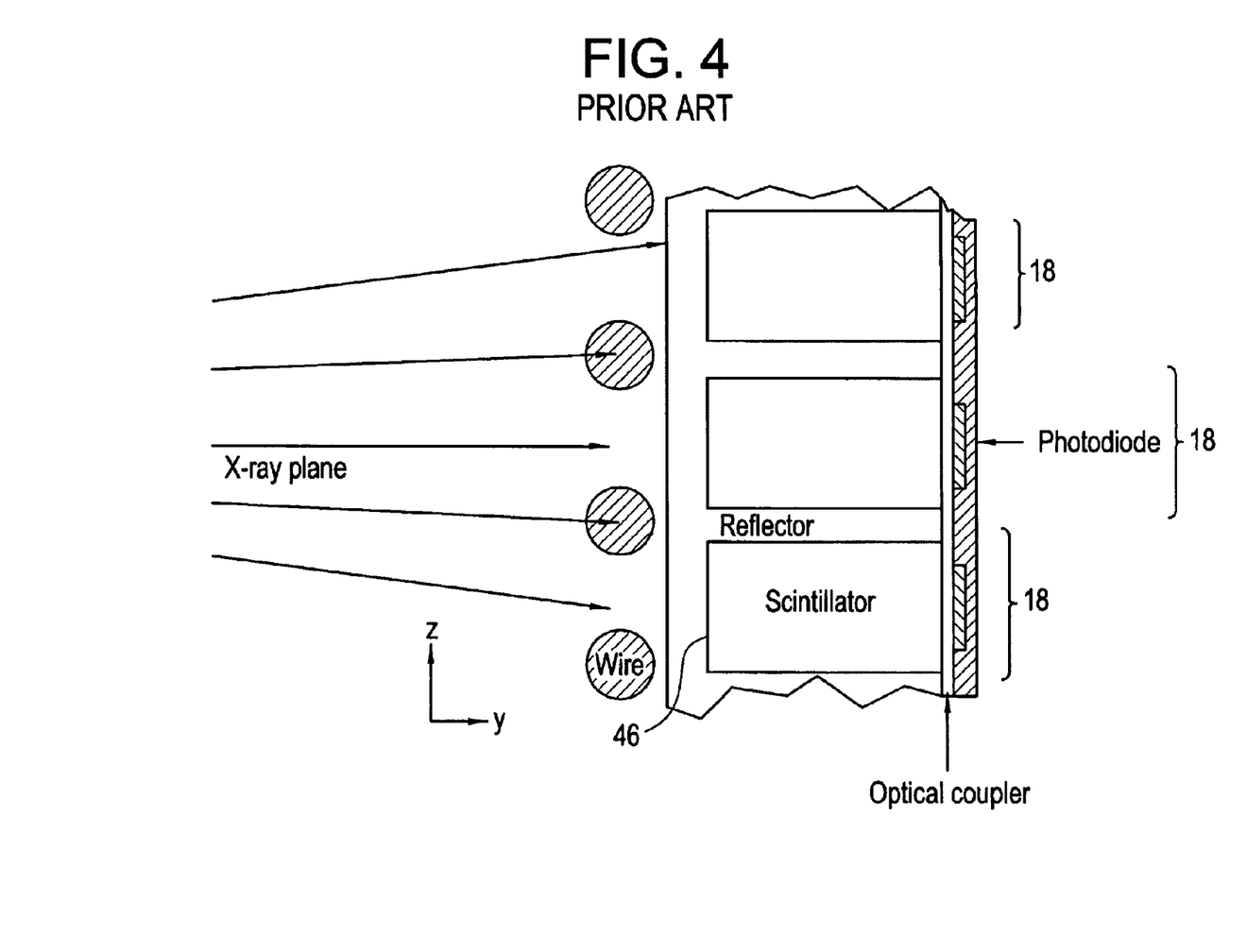
FIG. 4 depicts an illustration of a portion of an radiation detector.
Figure 5:
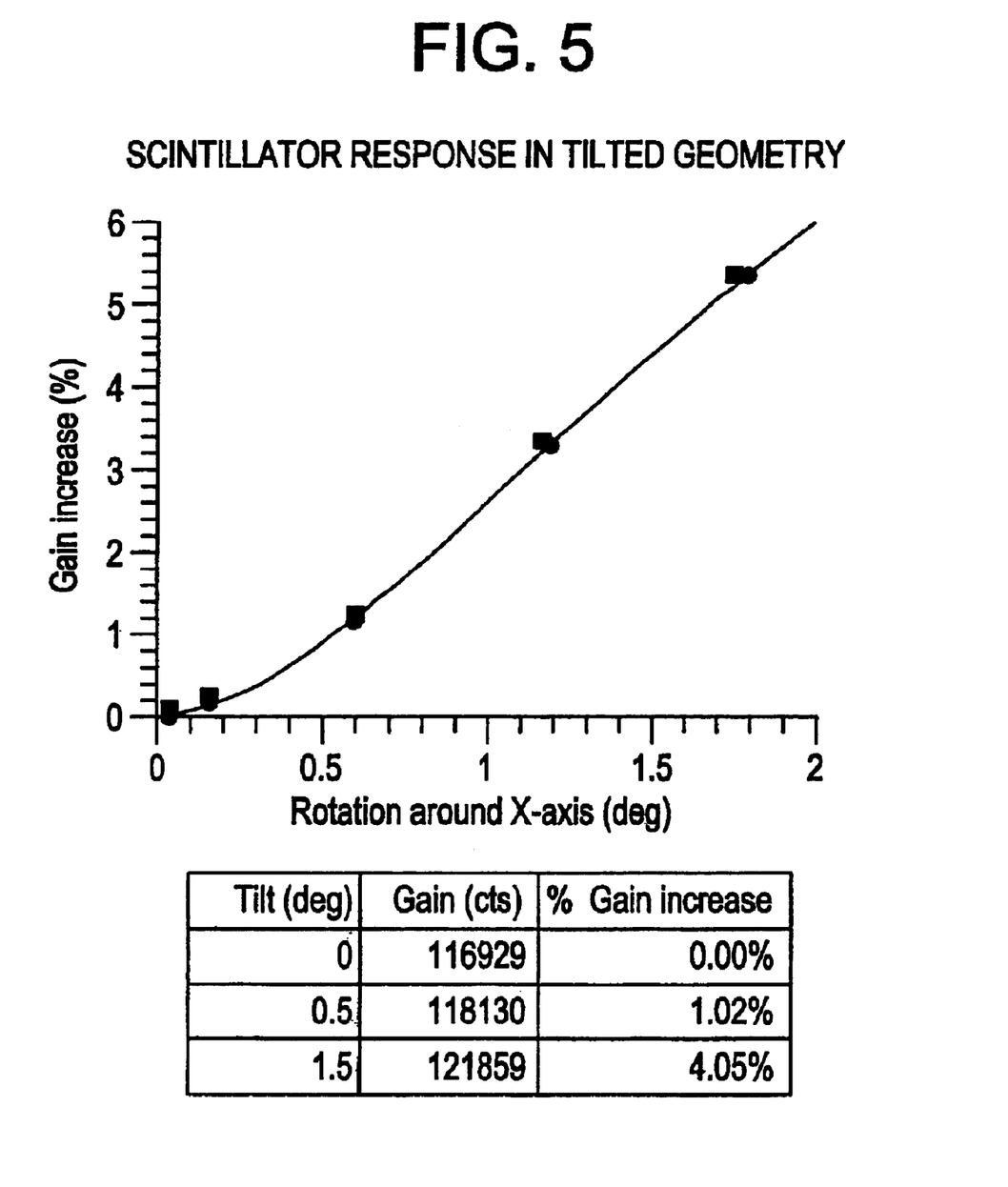
FIG. 5 depicts a graphical representation of tilt response of a scintillator.

FIG. 4 depicts a portion of a radiation detector 6 employing a conventional configuration for the scintillator(s) 46, each detector element 18 is subjected to x-rays from a range of angles (only one dimension is shown) depending on its position in the x-axis and z-axis, relative to the position of the x-ray beam focal spot. By putting the wires in Z-axis and plates in X-axis, the edges of the cells in z-axis are shielded from x-rays and hence do not contribute in the output signal. For example, the angular range for a CT detector is approximately ±1 degree at the extreme edges of the detector. In this case, the further the cell from the x-ray plane, the larger is the inclination angle and the higher is the contribution in the signal from the edges if they are excited by x-rays in wireless configuration. The scintillating segments (in Z-axis also called slices) are separated by a non-scintillating reflector (low Z-value) that are shielded by tungsten wires. The scintillation light (generated from the conversion of x-rays into light) is then guided towards a photo sensor 44 through multiple reflections. Notably, the scintillation response is minimum when x-rays are perpendicular to the cell, and increases with increasing angles from perpendicular because the effective geometric efficiency (effective exposed area) increases with angle due to edge exposure and generation of light by cell edges hit by x-rays. If some of the light is generated on the edges (when exposed to x-rays), it will be collected more effectively because it is near the photo sensor 44 and becomes subject to less reflection and attenuation. The less perpendicular the beam 14 is to the surface entrance of the cell, the higher the opportunity is to excite the edge of the scintillator 46 and the higher the light output is. Minimum gain occurs when the x-ray beam 14 is perpendicular to the cell detector element's 18 surface and not exposing the edges thereof. FIG. 5 shows a experimental and simulated behavior of the photo sensor 44 response as a function of the x-ray incidence angle upon the scintillator 46. In case of the edges being different for adjacent cells within a slice, the corresponding cells will exhibit non-linear differential error as a function of the focal spot motion.

Continuing with FIG. 4 and considering a particular slice, each cell or detector element 18 within the slice exhibits a slightly different edge angle (or rotation angle around x-axis) with respect to the x-ray beam 14 and thus individual channels (in the x direction) or rows or slices (in the z direction) will respond differently to the x-ray beam 14 motion. Therefore, various detector elements 18 or cells will exhibit slight phase differences for a particular gain point e.g., the minimum gain point. Thus, when the x-ray beam 14 focal spot moves in z-direction (or the x-direction for that matter) the response of various channels will be different.

FIG. 5 depicts a simulated response of a scintillator 46 as a function of rotation around x-axis (equivalent shift in z-axis). It should be noted that a similar phenomenon is exhibited by the scintillator for rotation about the z-axis. This is an undesirable characteristic, as for calibration purposes, it is beneficial for each detector element to exhibit substantially the same response for a given input.

Figure 6:
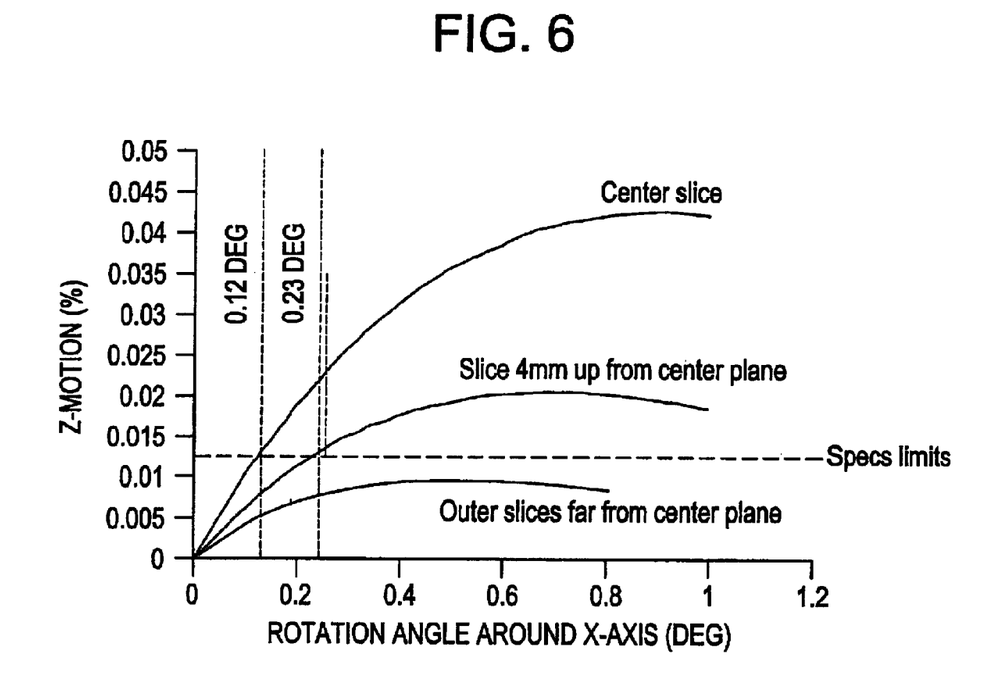
FIG. 6 depicts a graphical representation of tilt response for different detector elements.

It will further be appreciated that detector elements in the center slices exhibit higher sensitivity to the z-axis beam motion (focal spot) than other locations. FIG. 6 depicts illustrative responses for motion of the focal spot as a function of rotation angle (around x-axis). Observation of the graphs indicates that the slices taken away from the center of the radiation detector 6 exhibit nearly half as much sensitivity to tilt or rotation (in this instance around the x axis) and this is due to the angle due to elevation from center plane. The motion of the focal spot is due to such causes as thermal expansion and centrifugal forces interacting with gravity and includes a range of about 1 mm. Moreover, the tilt differences between channels (and/or various slices), result in a differential gain variation of about ±2% or more over the range of focal spot position (±1 degree). The angle is defined by the difference in detector element 18 to detector element 18 (also known as channel to channel for the x-axis). Therefore, the z-motion error may be defined by the following:

$$Z_{MOTION} = \left( \frac{Ch(i)|_{position\_1}}{Ch(i)|_{position\_2}} - \frac{Ch(i+1)|_{position\_1}}{Ch(i+1)|_{position\_2}} \right)$$

where

Ch(i)) is the output from the detector element associated with an $i_{th}$ channel;

Ch(i+1) is the output from the detector element associated with the (i+1) channel; and the position corresponds to the location of the focal spot in Z-axis relative to the detector plane.

It should be noted that while the above discussion and illustration are drawn to z-axis motion, similar considerations are applicable to the x-axis motion.

Third generation CT scanners can produce rings, bands and center spot artifacts when differential gain error exceeds approximately 0.02% in the center region for channel to channel differences. To compensate, at least some differential gain values may be calibrated and corrected during image reconstruction. However, the variation in incident angle changes and it is difficult to track it. In addition to that, changes due to different built-in angles (i.e., combination of angles due to position of the cell in z-axis (and x-axis) and built-in tilt angle due to edge imperfection) will induce non-linear variation of gain when the focal spot moves in Z-direction or in X-direction in wireless detector. This non-linear behavior is difficult to compensate for and will require additional procedures, as well as extended calibration time on every single cell. Moreover, differential gains due to focal spot motion during scanner operation are not easily correctable even where software algorithms are used.

Figure 7:
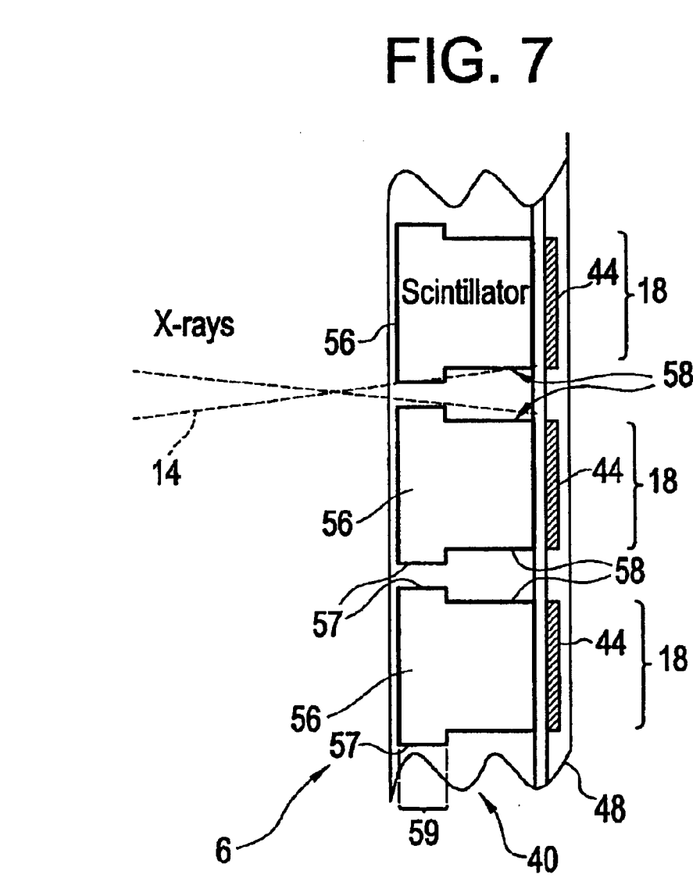
FIG. 7 depicts an illustration of a portion of an radiation detector employing an exemplary embodiment.
Figure 8:
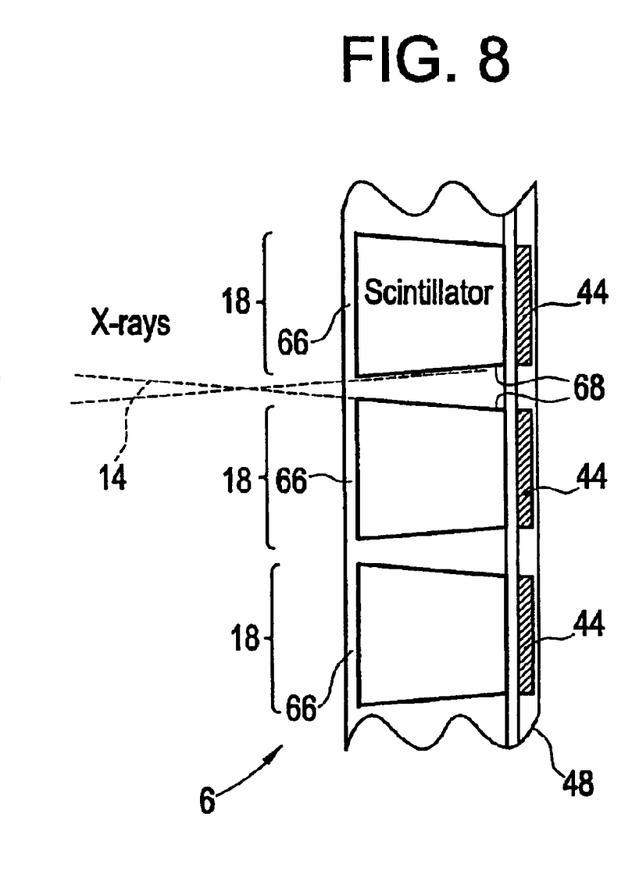
FIG. 8 depicts an illustration of a portion of a radiation detector employing an alternative exemplary embodiment.

An embodiment of the present invention provides for the x-ray impinging on the edges of scintillator and photo sensor, a method, such that the difference between channels of the same slice become insensitive to x-ray beam angle or to the focal spot motion in z-direction (or x-direction for that matter). In an exemplary embodiment, this is achieved by configuring the detector elements 18 or cell such that x-rays beams 14 do not make contact with the edges of the scintillator e.g., 56 and 66, or at least the contact is reduced for a particular tilt of the scintillator 56, and 66 for a range of angles determined by the distance between the focal spot-detector and the range of the spot motion. Moreover, the enhanced scintillators, e.g., 56 and 66 facilitate elimination of the shielding wires discussed earlier, and thereby reduce the cost to produce the radiation detector 6. Another advantage of the embodiments disclosed herein is the reduction in calibration or test time resultant from the elimination of the shielding wires of prior configurations. Additionally, because the embodiments disclosed herein exhibit reduced sensitivity to x-ray beam 14 motion (x-axis or z-axis), motion induced artifacts are reduced. Reduction of motion-based artifacts enhances image clarity and improves detection. Finally, with the removal of the shielding wires of the current radiation detector, dose efficiency is improved, minimizing the impact on the patient.

FIGS. 7 and 8 each depict a portion of an exemplary radiation detector 6 with detector elements 18 including enhanced geometry scintillators 56 and 66 respectively. The figures depict a cross sectional view of the geometry of the scintillators 56, and 66 respectively, in one axis (e.g., along the z axis or x-axis). In an exemplary embodiment, the scintillator 56 is substantially cube shaped and is configured such that over the range of focal spot position motion, no x-rays or a very small fraction of x-rays fall on edges/sides portion of the scintillator 55 and 66 respectively, and thereby yielding substantially uniform response to the x-ray beam 14 variations discussed earlier. For example, referring to FIG. 7, it can be seen that the sides of the scintillator 56 include a widened portion, flange, or overhang 57, which prevents the incident x-ray beam 14 for a selected amount of motion from impinging on a portion of the edge 58 of the scintillator 56 nearest the photo sensor 44. The thickness of the widened portion or overhang 57 as well as the depth 59 of the overhang may be selected as needed to arrive at a geometry that provides the desired shielding effect. For example, for a given variation of the x-ray beam 14, a larger depth 59 yet thinner widened portion or overhang 57 provides similar shielding as would a smaller depth 59 with a larger widened portion or overhang 57. The exact configuration may be selected as needed to satisfy shielding as well as manufacturing constraints based on dimensions (size of cells, focal spot-detector distance, locations of cells in slice, range of motion of focal spot, etc).

Likewise, referring to FIG. 8, in an alternative embodiment, it can be seen that the side portion 68 of the scintillator 66 are cut, tapered outward away from the photo sensor 44, in a manner that once again precludes an incident x-ray beam 14 for a selected amount of focal spot motion from impinging on the side portion 68 of the scintillator 66. Once again, it should be evident that the taper may be selected as needed to satisfy the shielding requirements as well as manufacturing constraints based on dimensions (size of cells, focal spot-detector distance, locations of cells in slice, range of motion of focal spot, etc).

It should be noted that in each of the above illustrations the enhancement to the scintillator e.g., 56, and 66 is described in terms of a single axis (e.g., z-axis). Of course, similar application may be applied for the other axis (e.g., x-axis).

Although the preceding embodiments are discussed with respect to medical imaging, it is understood that the image acquisition and processing methodology described herein is not limited to medical applications, but may be utilized in non-medical applications as well.

As used herein, an element or step recited in the singular and preceded with the word "a" or "an" should be understood as not excluding plural elements or steps, unless such exclusion is explicitly recited. Furthermore, references to "an" or "one" "embodiment" of the present invention are not intended to be interpreted as excluding the existence of additional embodiments that also incorporate the recited features. Also as used herein, the phrase "reconstructing an image" is not intended to exclude embodiments of the present invention in which data representing an image is generated but a viewable image is not. However, many embodiments generate (or are configured to generate) at least one viewable image.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A radiation detector element assembly, comprising:
    a scintillator and a photo sensor, said scintillator including
        a first surface proximate to a photo sensor and a second surface distal to said first surface and receptive to a radiation beam; and
    a side portion of said scintillator configured to intercept impingement of a radiation beam thereon and reduce a response of said photo sensor to said impingement on said side portion;
    wherein said scintillator is tapered outwards using step cutting from said second surface to said first surface such that said radiation beam does not impinge on another side portion, in the vicinity of said photo sensor, for a selected range of focal spot motion; and
    wherein a size of said scintillator at said first surface is defined by a range of focal spot motion.

2. The radiation detector element of claim 1 wherein said second surface is configured to be larger than said first surface such that part of said radiation beam impinges only on said second surface and reduces a response of said photo sensor to said impingement.

3. The radiation detector element of claim 1 wherein said radiation beam is an x-ray beam.

4. The radiation detector element of claim 1 wherein said side portion includes a flange.

5. The radiation detector element of claim 4 wherein said flange is configured with a thickness and depth to intercept said radiation beam for a selected focal spot motion.

6. The radiation detector element of claim 1 wherein said side portion is tapered outward from said first surface to said second surface.

7. The radiation detector element of claim 1 wherein said scintillator is configured to reduce sensitivity of said photosensor to s selected focal spot motion.

8. A method of detecting an incident radiation beam comprising:

receiving a radiation beam incident upon a second surface of a scintillator, said scintillator including a first surface proximate to a photo sensor and a second surface distal to said first surface; and intercepting impingement of a radiation beam with a side portion of said scintillator, said side portion of said scintillator configured to reduce response of said photo sensor to said impingement on said side portion;

wherein said scintillator is tapered outwards using step cutting from said second surface to said first surface such that said radiation beam does not impinge on another side portion, in the vicinity of said photo sensor, for a selected range of focal spot motion; and wherein a size of said scintillator at said first surface is defined by a range of focal spot motion.

9. The method of claim 8 wherein said second surface is configured to be larger than said first surface such that part of said radiation beam impinges only on said second surface and reduces response of said photo sensor to said impingement.

10. The method of claim 8 wherein said radiation beam is an x-ray beam.

11. The method of claim 8 wherein said side portion includes a flange.

12. The method of claim 11 wherein said flange is configured with a thickness and depth to intercept said radiation beam for a selected focal spot motion.

13. The method of claim 8 wherein said side portion is tapered outward from said first surface to said second surface.

14. The method of detecting an incident radiation beam of claim 8 wherein said scintillator is configured to reduce sensitivity of said photosensor to a selected focal spot motion.

15. A radiation detector array for use in imaging systems, comprising:

a scintillator array disposed in an operable configuration with a photo sensor array, said scintillator array including a plurality of scintillators and said photo sensor array including a plurality of photo sensors;

each scintillator of said plurality of scintillators including a first surface proximate to a photo sensor of said plurality of photo sensors and a second surface distal to said first surface and receptive to a radiation beam;

a side portion of said each scintillator configured to intercept impingement of a radiation beam thereon and reduce a response of said each respective photo sensor to said impingement on said side portion;

wherein said scintillator is tapered outwards using step cutting from said second surface to said first surface such that said radiation beam does not impinge on another side portion, in the vicinity of said photo sensor, for a selected range of focal spot motion; and wherein a size of said scintillator at said first surface is defined by a range of focal spot motion.

16. The radiation detector array of claim 15 wherein said scintillator is configured to reduce sensitivity of said photosensor to a selected focal spot motion.

17. A means for detecting an incident radiation beam comprising:

means for receiving a radiation beam incident upon a second surface of a scintillator, said scintillator including a first surface proximate to a photo sensor and a second surface distal to said first surface; and means for intercepting impingement of a radiation beam with a side portion of said scintillator, said side portion of said scintillator configured to reduce a response of said photo sensor to said impingement on said side portion;

wherein said scintillator is tapered outwards using step cutting from said second surface to said first surface such that said radiation beam does not impinge on another side portion, in the vicinity of said photo sensor, for a selected range of focal spot motion; and wherein a size of said scintillator at said first surface is defined by a range of focal spot motion.

18. The means for detecting an incident radiation beam of claim 17 wherein said second surface is configured to be larger than said first surface such that part of said radiation beam impinges only on said second surface and reduces response of said photo sensor to said impingement.

19. The means for detecting an incident radiation beam of claim 17 wherein said radiation beam is an x-ray beam.

20. The means for detecting an incident radiation beam of claim 17 wherein said side portion includes a flange.

21. The means for detecting an incident radiation beam of claim 20 wherein said flange is configured with a thickness and depth to intercept said radiation beam for a selected focal spot motion.

22. The means for detecting an incident radiation beam of claim 17 wherein said side portion is tapered outward from said first surface to said second surface.

23. The means for detecting an incident radiation beam of claim 17 wherein said scintillator is configured to reduce sensitivity of said photosensor to a selected focal spot motion.

* * * * *

UNITED STATES PATENT AND TRADEMARK OFFICE
CERTIFICATE OF CORRECTION

PATENT NO. : 6,979,826 B2 Page 1 of 1
APPLICATION NO. : 10/064590
DATED : December 27, 2005
INVENTOR(S) : Abdelaziz Ikhlef

It is certified that error appears in the above-identified patent and that said Letters Patent is hereby corrected as shown below:

Column 6,
Line 37, after "the", delete "(i+1)" and insert therefor -- $(i+1)_{th}$ --.

Column 9,
Line 13, after "to", delete "s" and insert therefor --a--.

Signed and Sealed this

Ninth Day of January, 2007

JON W. DUDAS
*Director of the United States Patent and Trademark Office*